US005515592A

United States Patent [19]

Mills

[11] Patent Number: 5,515,592

[45] Date of Patent: May 14, 1996

[54] METHOD OF MAKING A DOLL HAVING AN IMAGE IMPREGNATED THEREON

[76] Inventor: Kimberley A. Mills, 2401 W. Muriel Dr., Phoenix, Ariz. 85023

[21] Appl. No.: 213,564

[22] Filed: Mar. 16, 1994

[51] Int. Cl.[6] .................................................. B23P 17/00

[52] U.S. Cl. ......................... 29/412; 446/369; 446/372; 446/385; 446/387; 446/391

[58] Field of Search ......................... 29/412, 415, 805; 446/268, 369, 391, 491, 372, 385, 387, 390

[56] References Cited

U.S. PATENT DOCUMENTS

| | | | |
|---|---|---|---|
| 4,929,213 | 5/1990 | Morgan | 446/369 |
| 5,314,370 | 5/1994 | Flint | 446/391 |

FOREIGN PATENT DOCUMENTS

| | | | |
|---|---|---|---|
| 418730 | 3/1991 | European Pat. Off. | 446/391 |
| 345077 | 12/1993 | Japan | 446/391 |
| 22825 | of 1909 | United Kingdom | 446/391 |

*Primary Examiner*—David P. Bryant
*Attorney, Agent, or Firm*—Harry M. Weiss; Jeffrey D. Moy; Harry M. Weiss & Associates

[57] ABSTRACT

A method of making a doll having an image impregnated thereon is disclosed comprising the steps of obtaining the image, forming an altered image that is substantially similar to the original image, copying the altered image onto heat transfer paper using a copying machine, applying the altered image from the heat transfer paper onto material, and constructing the doll with the material. A color laser copier is used to form the altered image and to make a copy of the altered image onto heat transfer paper. In particular, the color laser copier is used to reduce or expand the size of the original image, and, in addition, the mirror image function of the copier is used to copy a mirror image of the original image onto the heat transfer paper. As a result, when the altered image, namely the reduced or enlarged mirror image, is applied from the heat transfer paper onto the material which is used to make the doll, the altered image is properly shown on the doll.

6 Claims, 1 Drawing Sheet

METHOD OF MAKING A DOLL HAVING AN IMAGE IMPREGNATED THEREON

BACKGROUND OF THE INVENTION

1. Field of the Invention

This invention relates generally to dolls and methods of making dolls and, more specifically, to dolls having an image impregnated thereon and methods therefor.

2. Description of the Related Art

There are many different types of dolls, and similarly, there are many different methods for making dolls. Of particular interest are methods of making dolls having images thereon.

It is well known to take a photograph of the face of an individual and affix the photo to the face of a doll. This has been shown in U.S. Pat. No. 2,199,049 which was filed in the name of Greenburg and entitled, "Changeable Figure Toy." In addition, U.S. Pat. No. 4,020,586 which was filed in the name of Benner and entitled, "Doll with Envelope for Photo Image Face, and Hair Concealing Envelope Opening", shows the use of a pocket or sleeve for temporarily storing a photo on the face of a doll.

U.S. Pat. No. 4,993,987 which was filed in the name of Hull et al and entitled, "Doll with Photo Image Face" shows a doll having a personalized, photographic face impregnated in the material of which the doll is constructed. The Hull et al doll taught the use of sublimation in order to impregnate the material used to make the doll. Using a matrix scanner, color photos were scanned for the three basic colors of yellow, red, and blue. Then a stencil was cut for each of the three colors. Using an offset printer, each of the stencils were then run through, using the sublimation ink corresponding to the color of each stencil. When a single piece of paper was run through the printer three times, the paper would have a coating of each color. The image would appear to be yellow at first, then as the paper was run through the red ink, the image would appear slightly rusty in color. As the paper was run through the blue ink, the image would appear more lifelike. By passing the paper through the printer three times, the overlay of the inks would be capable of attaining most of the colors of the spectrum. This approach has several disadvantages, namely, poor color reproduction and wasted time. More specifically, the color reproduction available from this process is far less realistic than the color reproduction offered by other methods currently available such as the use of a high quality color copier machine. In addition, using a color copier machine permits time savings because it is not necessary to run the image paper through the machine more than one time.

Therefore, there existed a need to provide an efficient method of producing dolls having an image or a plurality of images impregnated thereon.

SUMMARY OF THE INVENTION

In accordance with one embodiment of this invention, it is an object of this invention to provide a method of making a doll having an image impregnated thereon.

It is another object of this invention to provide a doll manufactured by the method of making a doll having an image impregnated thereon.

It is a further object of this invention to provide a method of making a doll having a plurality of images impregnated thereon.

It is yet another object of this invention to provide a doll manufactured by the method of making a doll having a plurality of images impregnated thereon.

BRIEF DESCRIPTION OF THE PREFERRED EMBODIMENTS

In accordance with one embodiment of this invention, a method of making a doll having an image impregnated thereon is provided comprising the steps of obtaining the image, forming an altered image that is substantially similar to the image, copying the altered image onto heat transfer paper using a copying machine, applying the altered image from the heat transfer paper onto material, and constructing the doll with the material. This method also includes the step of removing portions of the altered image, if necessary. The step of forming includes the steps of altering dimensions of the image and obtaining a mirror image of the image. For example, the copying machine can alter the dimensions of the image by reducing or enlarging the size of the image, and, in addition, the copy machine can obtain a mirror image of the image by using the mirror image function of the copy machine. The step of applying the altered image includes the steps of preheating the material, placing the heat transfer paper having the altered image thereon against the material, and moving a heat source over the heat transfer paper in order to transfer the altered image onto the material. The step of constructing the doll comprises the steps of cutting a portion of the material having the altered image thereon, coupling the portion of the material together and stuffing an interior portion formed by the coupling with another material, and decorating the material in order to form the doll. The step of decorating the doll can include any of the numerous doll decorating schemes. For example, one can decorate the doll by dressing it in doll clothes, by dressing the doll with accessories such as glasses, by giving the doll hair, or by any other desirable doll decoration. Preferably, the copying machine is a color laser copier, although other copying machines are permissible. Typically the image which is impregnated upon the doll is the face of a person.

In accordance with another embodiment of this invention, a method of making a doll having a plurality of images impregnated thereon is provided comprising the steps of obtaining the plurality of images, forming a plurality of altered images wherein each altered image of the plurality of altered images is substantially similar to a corresponding image of the plurality of images, copying each altered image of the plurality of altered images onto heat transfer paper using a copying machine, applying a combined image comprising portions of each sheet of heat transfer paper having an altered image thereon and merging the portions together before applying onto material, and constructing the doll with the material. This method also includes the step of removing portions of each altered image of the plurality of altered images, if desired. The step of forming includes the steps of altering dimensions of each image of the plurality of images and obtaining a mirror image of each image of the plurality of images. For example, the copying machine can alter the dimensions of the image by reducing or enlarging the size of the image, and in addition, the copy machine can obtain a mirror image of the image by using the mirror image function of the copy machine. The method also includes the step of merging each altered image of the plurality of altered images together for forming the combined image for the doll. The step of applying the combined image includes the steps of preheating the material, placing the heat transfer paper having the combined image thereon against the material, and moving a heat source over the heat transfer paper in order to transfer the combined image onto the material. The step of constructing the doll comprises the steps of cutting a portion of the material having the combined image thereon, and coupling the portion of the material together and stuffing an interior portion formed by the coupling with another material in order to form the doll. The plurality of images includes at least a face and a body of a person, or a face of a first person and a body of a second character. Please note that the body of the second character could be the body of an animated character, animated figure, a real person, or some desirable alternative. For example, one could create a doll having the face of a child matched with the body of an animated fire fighter, an animated policeman, or a sports hero, etc. In short, one can match the image of the face of a first person with the image of the body of any figure, character, or person desired.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

Figure 1:
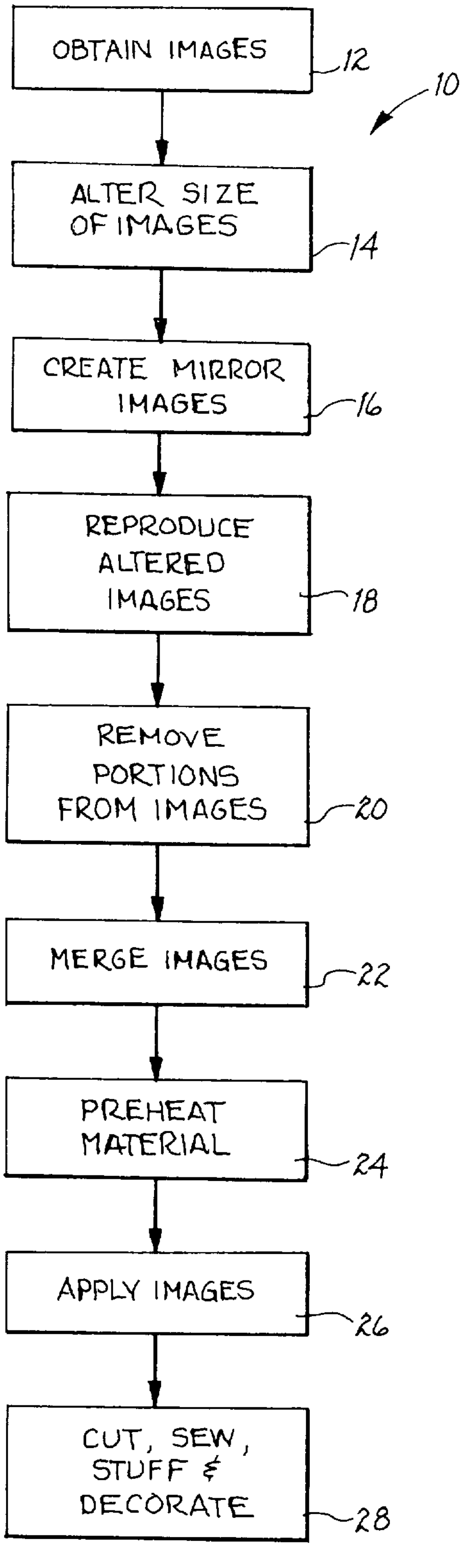
FIG. 1 is a simplified block diagram representing the logical sequence of steps required to make the doll.
Figure 2:
FIG. 2 is a perspective view of the doll made via the embodiment of the method for making a doll having an image impregnated thereon.

Referring to FIG. 1, a simplified block diagram is shown which represents, in general, the logical sequence of steps performed in the method for making a doll having an image impregnated thereon. The overall method is generally referred to by reference number 10. The particular embodiment of the method 10 that is used to make the doll 30 (see FIG. 2) having a facial image 32 impregnated thereon includes method steps 12–20 and 24–28.

The first step in method 10 is to obtain an image, such as a photograph, having the desired facial image 32 thereon. It is not necessary to find a picture having the facial image 32 alone, or having the facial image 32 of the exact size required for use on the face of the doll 30, because the manner in which the next steps are carried out forgoes such requirements. In particular, the next three steps 14–18 of the method 10 implement a copy machine such as the Cannon Color Laser Copier. The copy machine permits a user to alter the size 14 of the facial image 32 by selecting either a size enlargement or a size reduction option, and, of course, the user has the additional option of neither enlarging nor reducing the size of the facial image 32. The copy machine is also used to create a mirror image of the facial image 32. More specifically, the Cannon Color Laser Copier has a mirror image function 16 that permits a user to rotate the left and right sides of the image. For example, suppose a facial image 32 to be copied was facing to the left in a photograph. After selecting the mirror image function 16 and copying the facial image 32, the image 32 on the heat transfer paper will be facing to the right. This feature is critically important to the method 10, because a facial image 32 that is facing right on the heat transfer paper is shifted to facing to the left when the copy on the heat transfer paper is applied to the doll 30. Therefore, in order to maintain the orientation of the facial image 32 shown in the original photograph, it is necessary to copy the mirror image of the original facial image 32 onto the heat transfer paper, so that when the facial image 32 is applied from the heat transfer paper onto the doll 30, thereby reversing again the facial image 32, the original perspective of the facial image 32 is attained on the doll 30. In short, the copy machine alters the original facial image 32 by enlarging or reducing the size of the image 32, if needed, and by creating the mirror image. In step 18 of the method 10, the copy machine reproduces the altered image onto heat transfer paper. Heat transfer paper is well known, and specific brands such as Phototrans or Magic Touch heat transfer paper may be used.

In method step 20, the unwanted portions of the altered image may be removed from the heat transfer paper by using scissors, for example, in order to cut and remove the undesirable portions from the heat transfer paper. Unwanted portions might include the body image of a person when only their facial image is desired. Method step 22 is used for the alternative embodiment which is used to create the doll 34 shown in FIG. 3. Method step 24 requires the user to preheat, to about 425 degrees Fahrenheit, the material which is going to have the altered facial image 32 impregnated thereon. At this point, it is appropriate to note that dolls may be made from any one of a number of different types of materials, and while dolls 30 and 34 are nominally made out of a polyester/cotton mixed material, the dolls 30 and 34 may be made out of any suitable material. During the application process 26, the heat transfer paper having the facial image 32 thereon is placed against the material, and then a heat source at approximately 425 degrees Fahrenheit is applied for about 15 seconds over the heat transfer paper in order to transfer the facial image 32 onto the material. Next in method step 28, the doll 30 is fabricated. Several methods of constructing a doll are well known in the doll manufacturing art, and consequently, if desired, different doll construction methods may be implemented. Nonetheless, in general, the method of constructing the doll 30 comprises the stages of cutting the material having the facial image 32 thereon into a general shape which can be coupled into the doll 30, coupling the material together, stuffing an interior portion formed by the coupling with another material such as a cushion, and decorating the material which has been coupled into the shape of the doll 30 in order to create the doll 30. As previously stated, the step of decorating the doll 30 can include any of the numerous doll decorating schemes such as dressing the doll 30 in doll clothes, placing glasses on the doll 30, and decorating the doll 30 with hair or any other desirable decoration.

Figure 3:
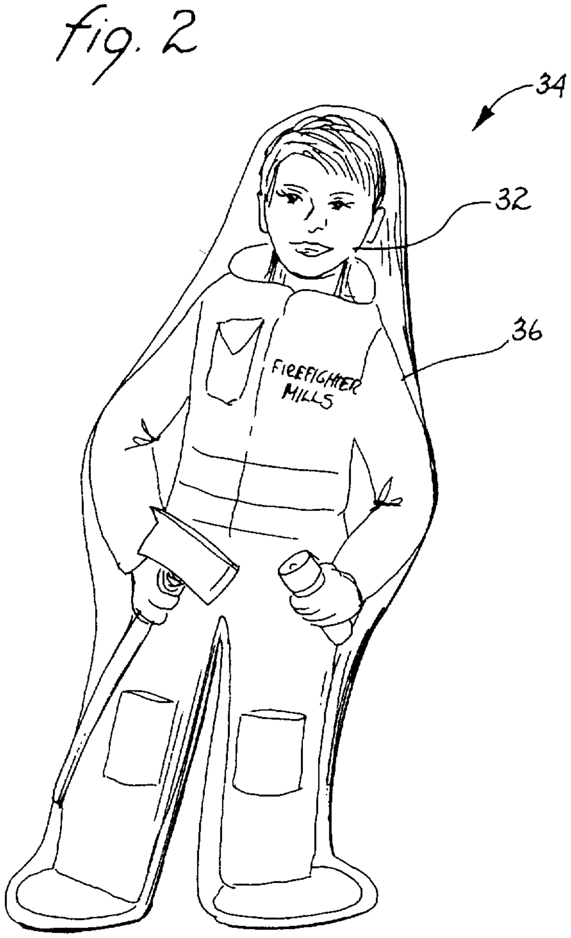
FIG. 3 is a perspective view of the doll made via the embodiment of the method for making a doll having a plurality of images impregnated thereon.

Referring to FIG. 3, a doll 34 is shown that has a plurality of images impregnated thereon, namely a facial image 32 and a body type image 36. Note that a facial image 32 and body type image 36 from the same person may be used to produce the doll 34, or alternatively, a facial image 32 of a first person and body type image 36 of a second person, character, or figure may be used to produce the doll 34. This concept is quite advantageous in making a doll 34 having the facial image 32 of oneself and the body type image 36 of a celebrity figure.

In general, the method for producing the doll 30 is similar to the method for producing the doll 34. Consequently, for the sake of brevity, the procedure previously described for making the doll 30 will not be repeated, however, the primary difference between these two embodiments of the method 10 is that more than one image is used with the doll 34, as opposed to the single image 32 for the doll 30. As a result of this difference between these two embodiments of the method 10, the additional method step 22 is used to produce the doll 34, because it is necessary to merge the plurality of images together. In short, the logical steps 12–28 of the method 10 are used to make the doll 34, and the logical steps 12–20 and 24–28 of the method 10 are used to make the doll 30.

While the invention has been particularly shown and described with reference to the preferred embodiments thereof, it will be understood by those skilled in the art that the foregoing and other changes in form and details may be made therein without departing from the spirit and scope of the invention. For example, if desired, one could implement the use of a digital scanner for scanning one or more images and storing the digital representations thereof into a computer. Subsequently, a computer graphics program could alter the digital representations of the image(s) in a manner that is analogous to the alterations performed on the image(s) by the copy machine of the preferred embodiment. More particularly, the computer program could enlarge or expand the dimensions of the image(s) and obtain the mirror image(s) thereof. Since interfacing a copy machine or a high quality printer with a computer is well known in the art, the digital representations of the altered image(s) could then be output from the computer to a laser printer for printing the image(s) onto the heat transfer paper. The remainder of the procedure for making dolls 30 and 34 would be largely unchanged. Thus, if desired, one could implement the use of a digital scanner, a computer having appropriate software, and a printer with the method of making a doll with an image impregnated thereon.

What is claimed is:

1. A method of making a doll having a plurality of images impregnated thereon comprising the steps of:

obtaining a facial image and a separate body image;

using a photocopier to form an altered image of said facial image and a separate altered image of said body image, said altered images being mirror images of, and having dimensions different than, their corresponding original images;

copying said altered image of said facial image onto a first sheet of heat transfer paper;

copying said altered image of said body image onto a second sheet of heat transfer paper;

merging the portions of said first and second sheets of heat transfer paper having said altered images thereon to form a combined image;

transferring said combined image from said portions of heat transfer paper onto material to be used for the front of the doll; and constructing said doll with said material.

2. The method of claim 1 wherein said step of transferring said combined image includes the steps of preheating said material, placing said portions of heat transfer paper against said material, and moving a heat source over said portions of heat transfer paper in order to transfer said combined image onto said material.

3. The method of claim 1 wherein said step of constructing said doll comprises the steps of cutting the portion of said material having said combined image thereon from the remainder of said material, coupling said portion of said material together with another piece of material, and stuffing an interior portion formed by said coupling with a filler material.

4. The method of claim 1 wherein said photocopier is a color laser copier.

5. The method of claim 1 wherein said facial image is a face of a person and said body image is a body of a person.

6. The method of claim 1 wherein said facial image is a face of a first person and said body image is either a body of a second person or a body of an animated figure.

* * * * *